Dec. 17, 1968     O. MILLIE     3,416,249
REVERSIBLE SLIDE CHANGER
Filed Jan. 19, 1966     5 Sheets-Sheet 2

INVENTOR.
Orrin Millie
BY
Michael J. Striker
Atty

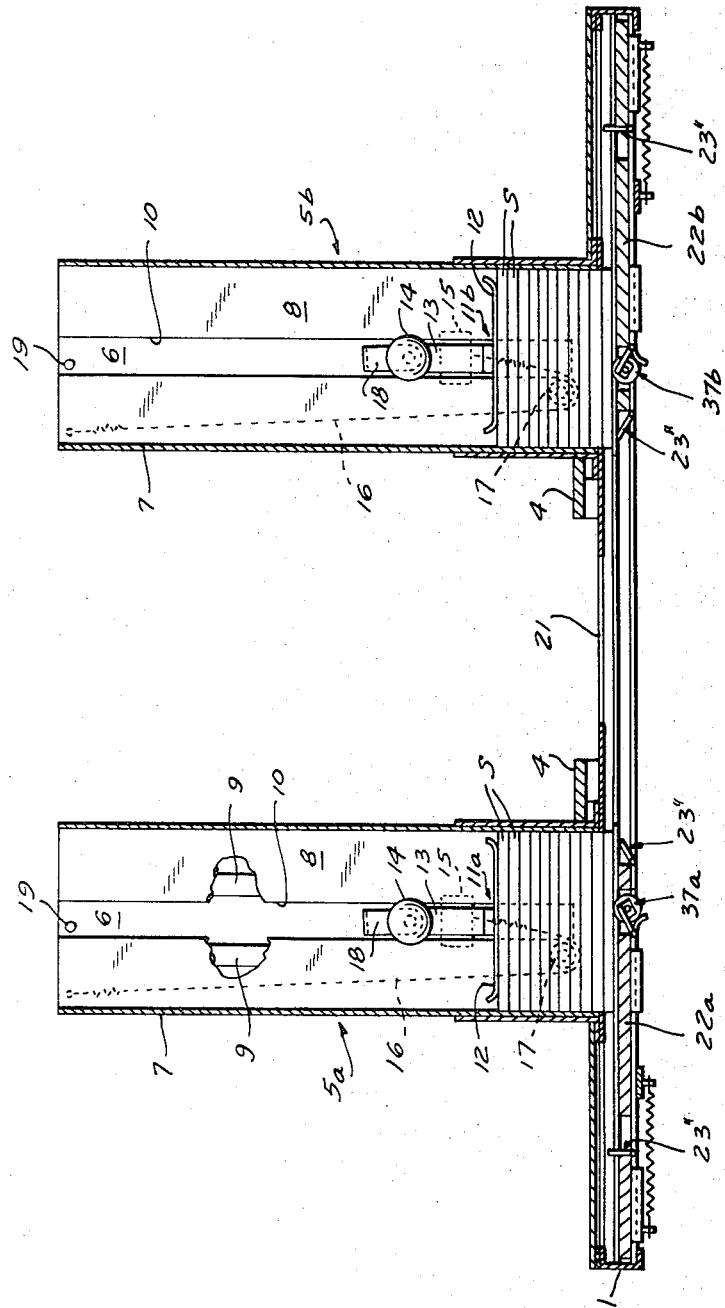

Dec. 17, 1968   O. MILLIE   3,416,249
REVERSIBLE SLIDE CHANGER
Filed Jan. 19, 1966   5 Sheets-Sheet 4
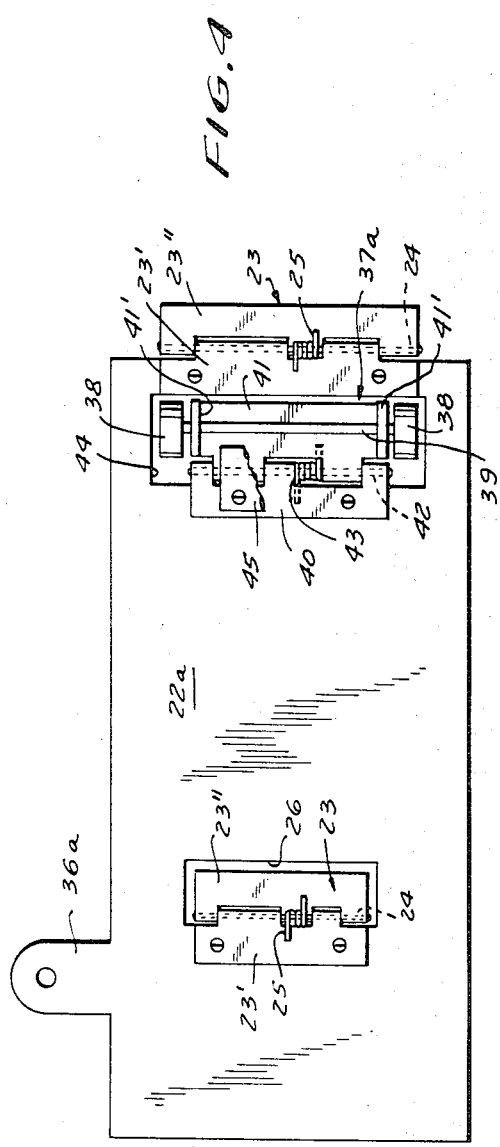
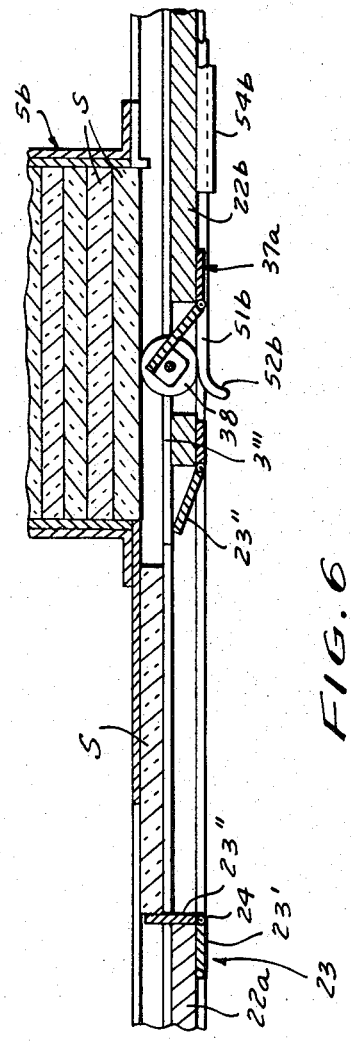
INVENTOR.
Orrin Millie
BY
Michael J. Striker
Atty

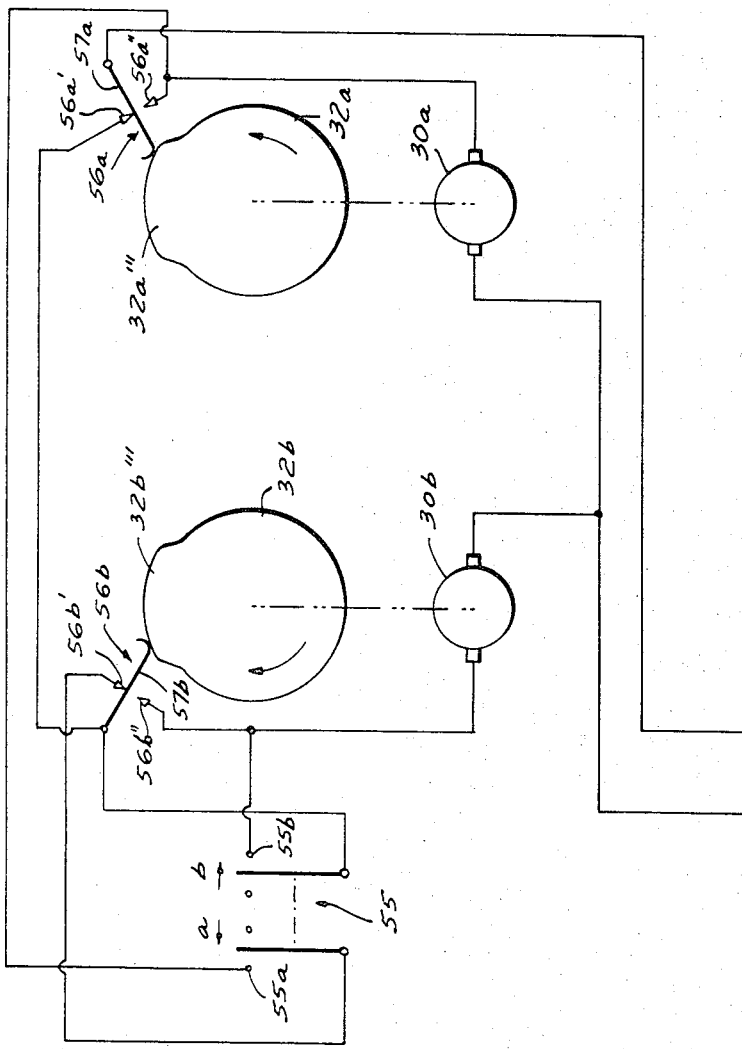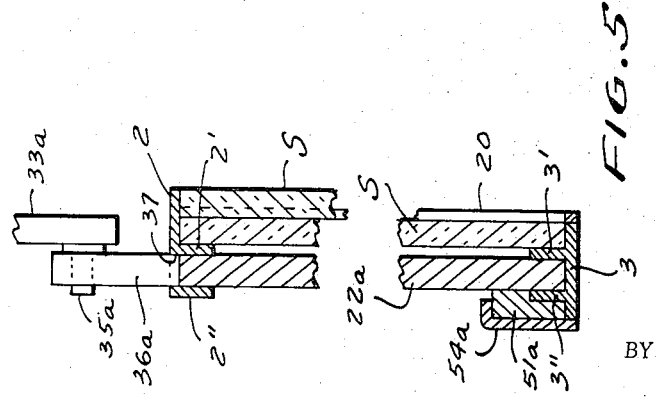

3,416,249
REVERSIBLE SLIDE CHANGER
Orrin Millie, Flushing, N.Y., assignor to
Genarco Inc., Jamaica, N.Y.
Filed Jan. 19, 1966, Ser. No. 521,615
16 Claims. (Cl. 40—79)

ABSTRACT OF THE DISCLOSURE

A reversible slide changer in which slides in a stack of slides in a first storage may be moved one by one from the front end of the first storage first to an exposure portion and from there into a second storage, and in which the slides stacked in the second storage may be moved one by one from the front end of the latter first into the exposure portion and from there back into the first storage.

---

The present invention relates to a slide changer, and more specifically to a reversible slide changer for a projector to move slides from slides storage means along a given path into an exposure portion along the path, where the image of slide located at the exposure portion may be projected onto a screen, and back to slide storage means.

Slide changers of this general type are known in the art in which the individual slides are held spaced from each other in a special magazine, in which the magazine during operation of the slide changer is advanced in a stepwise manner, either in a rotary or a straight motion so as to align a respective one of the slides in the magazine with a path along which the slides are moved from the magazine to the exposure portion and the thus aligned slide is then pushed along the path from the respective compartment of the magazine into the exposure portion. After the image of the slide at the exposure portion has been projected onto a screen, the slide is pushed back from the exposure portion into the compartment of the magazine in which it has been originally located, the magazine is again advanced one step to align the next slide therein with the aforementioned path, and the cycle is again repeated. These known slide changers have the disadvantage that, when a series of slides has to be projected, the slides have to be put first into the individual compartments of the magazines. Of course, the slides may be permanently stored in a certain sequence in the magazine, but this requires a great number of magazines if a very great number of slides has to be stored. Such magazines are relatively expensive and therefore the user of these known slide changers must either go to a great expense if he wants to store all his slides in special magazines, or the user has, before starting projection of a series of slides, put these slides one by one into successive compartments of a magazine.

It is an object of the present invention to provide a slide changer for a projector which avoids these disadvantages of slide changers known in the art.

It is a further object of the present invention to provide for a slide changer in which a plurality of slides to be projected one by one are moved one by one first into an exposure portion of the slide changer and then into a receiving portion thereof and in which the slide changer is constructed in such a manner that the slides moved to the receiving portion may be stored in a stack of slides in abutting relationship.

It is an additional object of the present invention to provide for a slide changer in which a stack of slides in abutting relationship may be placed in the slide changer to be moved one by one along a given path into an exposure portion located along the path and from the exposure portion into a receiving portion in which the slides, as they are received one by one, are again stored in a stack of slides in abutting relationship.

It is also an object of the present invention to provide for a reversible slide changer in which the slides from a stack of slides placed in the slide changer may be moved one by one into an exposure portion and from the exposure portion either back in the first mentioned stack of slides or into a receiving portion in which the slides will be automatically stacked in a second stack, and wherein the slides from the second stack may also be moved into the exposure portion and from there either back into the second stack or into the first stack of slides.

It is yet a further object of the present invention to provide for a slide changer of the aforementioned type which is constructed in such a manner that interference of the slides during the movement thereof is positively prevented so that the slide changer will operate trouble-free under extended use.

With these objects in view, the slide changer according to the present invention includes moving means for moving slides along a predetermined path, having an exposure portion and a receiving portion, first into the exposure portion and then from the exposure portion into the receiving portion, slide storage means associated with the receiving portion of the predetermined path and adapted to store the slides moved from the exposure portion into the receiving portion in a stack extending normal to the path to one side thereof, biasing means permanently tending to move the stack in a direction toward the receiving portion of the predetermined path, and displacement means for moving the stack of slides in direction away from the receiving portion each time another slide is moved by the moving means from the exposure portion into the receiving portion.

More specifically, the reversible slide changer according to the present invention comprises first slide storage means having a front end portion and adapted to store a plurality of slides in a stack rearwardly of said front end portion, first biasing means permanently tending to move a stack of slides in the first storage means in the direction toward the front end portion thereof, second slide storage means located laterally of and substantially parallel to the first slide storage means and also having a front end portion and being adapted to store a plurality of slides in a stack rearwardly at the front end portion of the second slide storage means, second biassing means permanently tending to move a stack of slides in the second slide storage means in a direction toward the front end portion thereof, first moving means for moving a slide at the front end portion of the first slide storage means along a predetermined path to an exposure portion located along the path between the front end portions of the first and second slide storage means and a slide at said exposure portion to the front end portion of the second slide storage means, second moving means for moving a slide at the front end portion of the second slide storage means along the path to the exposure portion and a slide at the exposure portion to the front end portion of the first slide storage means, first displacement means for moving the stack of slides in the first slide storage means in a direction away from the front end portion thereof each time a slide from the exposure portion is moved by the second moving means into the front end portion of said first slide storage means, second displacement means for moving a stack of slides in the second slide storage means in a direction away from the front end portion thereof each time a slide from the exposure portion is moved by the first moving means into the front end portion of the second slide storage means, and operator controlled actuating means for selectively actuating the first and second moving means.

Each of the moving means preferably includes a pusher member, suitably guided along the aforementioned path, which is moved during each actuation of the moving means along a working stroke from a rest position in the region of the front end of the respective slide storage means toward and beyond the exposure portion to an advanced position and along return stroke back to its rest position. The pusher member carries a pair of slide engaging means mounted on the pusher member and each movable between an active position adapted to engage an edge of a slide and an inactive position. The pair of slide engaging means are mounted on the pusher member spaced from each other in direction of the aforementioned path such a distance that, during movement of the pusher member from the rest to the advanced position thereof, one of the slide engaging means engages the edge of a slide located at the front end portion of one of the slide storage means to move the same into the exposure portion and the other slide engaging means engages an edge of a slide located at the exposure portion to move the last mentioned slide to the front end of the other slide storage means.

Depending on which moving means is actuated by the operator-controlled actuating means, a slide at the front end of one stack may therefore be moved from the one stack along the path to the exposure portion and from the exposure portion in front of the first slide in the other stack, whereby during movement of a slide from the exposure portion to the other stack the latter is moved rearwardly to prevent interference of the moving slide with the stack of slides in the other slide storage means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a partially sectioned view taken along the line III—III of FIG. 1 with some of the members shown in FIG. 1 omitted;

FIG. 4 is a front view of a pusher member and parts carried thereby, drawn to an enlarged scale;

FIG. 5 is a partial cross section taken along the line V—V of FIG. 1;

FIG. 6 is a partial cross sectional view showing one of the pusher members near the end of its working stroke adjacent to the front end of one of the slide storage means and in which a displacement means engages the first slide of a stack of slides in said one slide storage means to rearwardly displace this stack of slides; and FIG. 7 is a wiring diagram and schematically showing also some of the members of the slide changer.

Figure 1:
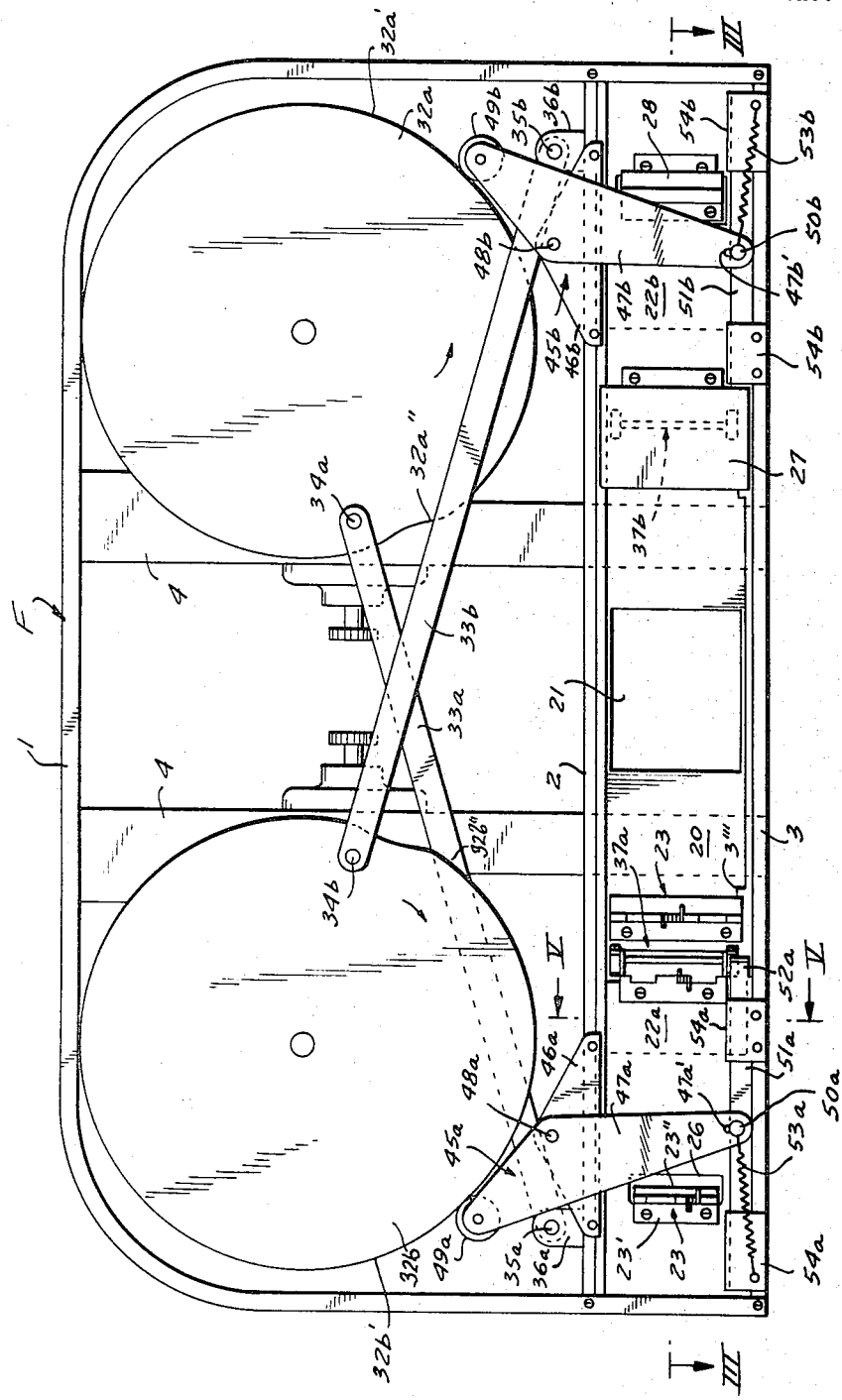
FIG. 1 is a front view of the slide changer according to the present invention.
Figure 2:
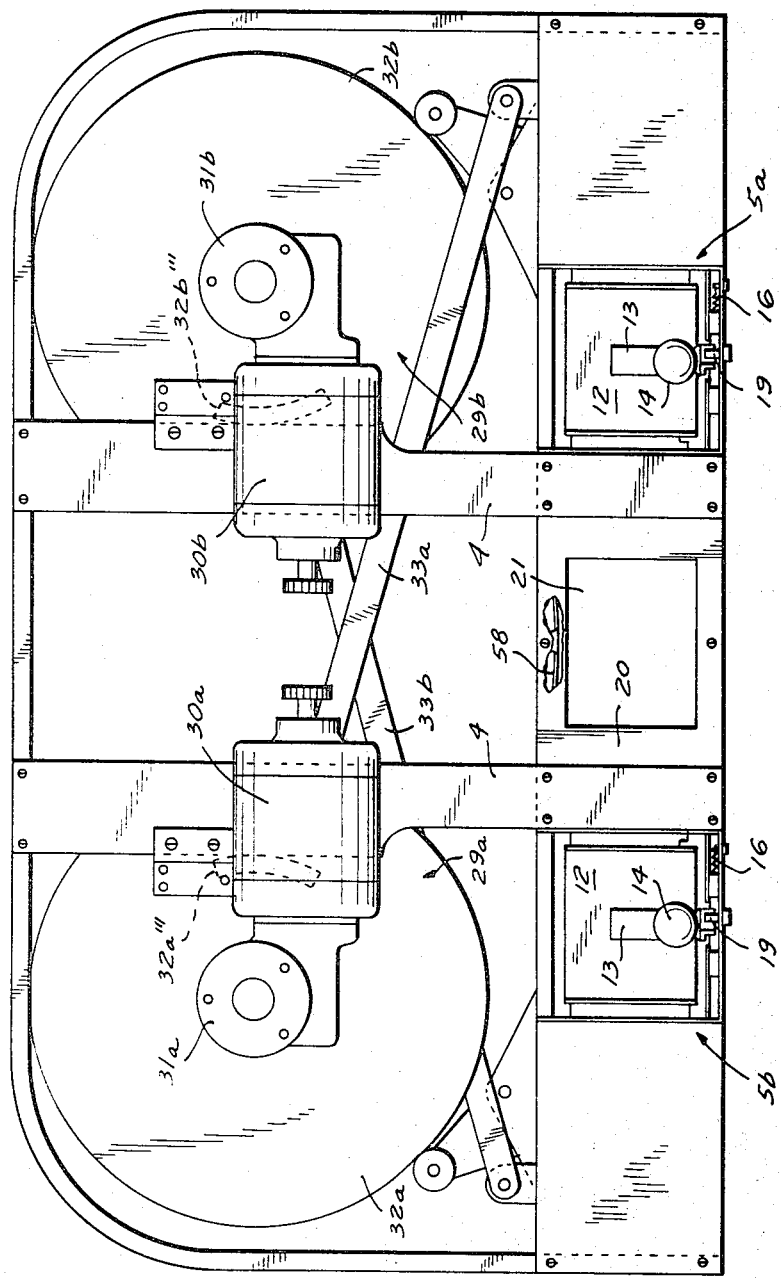
FIG. 2 is a rear view of the slide changer shown in FIG. 1.

Referring now to the drawings, and more specifically to FIGS. 1–3 of the same, it will be seen that the slide changer according to the present invention mainly comprises a frame F on which the various components of the slide changer are mounted either fixedly or movably. The frame is also adapted to carry a sheet metal housing, not shown in the drawing. The frame F has an upright bow-shaped member 1 connected in the region of the lower ends thereof by a pair of parallel guide rails 2 and 3, and a pair of upright members 4 extending spaced from and parallel to each other between an upper horizontal part of the bow-shaped member 1 and the pair of guide rails 2 and 3 and connected thereto in any convenient manner, for instance by screws or dowels. A pair of slide storage means 5a and 5b extend substantially parallel to each other and normal to the guide rails 2 and 3 rearwardly therefrom as can be best seen from FIG. 3. The slide storage means 5a has a bottom wall 6 and a pair of side walls 7 extending along opposite edges of the bottom wall 6 normal thereto and integrally connected therewith. A false bottom 8 is mounted by means of a pair of longitudinally extending spacer members 9 spaced from and parallel to the bottom wall 6 and defines with the upper portions of the side walls 7 a channel of rectangular cross section, open at the top and adapted to receive a plurality of slides S in a stack in which the slides abut against each other. The false bottom 8 is formed with a longitudinally extending central slot 10. The second slide storage means 5b is constructed in the same manner as the first slide storage means 5a. First biassing means 11a are mounted in the first slide storage means 5a and second biassing means 11b are mounted in the second slide storage means 5b for pressing a stack of slides in the respective slide storage means toward the front end portion thereof. The first biassing means 11a comprise a plate-shaped member 12 extending transversely through the channel formed by the false bottom 8 and the side walls 7 and substantially through the whole height of the same and the plate-shaped member has opposite rearwardly curved side edges. A strap 13 is fixed with an upright portion thereof in any convenient manner, for instance by spot welding, to the rear face of the plate 12 and the strap 13 has a rearwardly extending horizontal portion located slightly above the false bottom 8 and carrying at the free rear end thereof a button 14, of for instance spherical shape, so that the button 14 may be gripped by the operator and the strap 13 and the plate connected thereto be moved in longitudinal direction of the slide storage means. Fixedly connected to the bottom face of the horizontal portion of the strap 13 is a slide member 15 which extends with opposite edge portions thereof underneath the false bottom 8 and which is guided along vertical edge faces thereof along the inner edge faces of the spacer members 9. An elongated coil spring 16 is fixedly connected at one end thereof to the bottom wall 6 adjacent the rear edge of the latter. The coil spring 16 extends about a roller 17 turnably mounted in the space between the bottom wall 6 and the false bottom 8 in the region of the front end of the latter and the other end of the coil spring 16 is fixedly connected to the front of the slide member 15. The coil spring 16 is tensioned to move the slide member 15 and therewith the strap 13 and the plate 12 connected thereto toward the front end of the slide storage means 5a so as to press a stack of slides S located forwardly of the plate 12 toward the front end of the slide storage means 5a. A hook 18 is pivotally connected to the strap 13 in the region of the rear end of the latter and when the strap 13 with the plate 12 connected thereto is rearwardly displaced by manually engaging the button 14, the hook 18 may be engaged with a pin 19 projecting upwardly from the bottom wall 6 into the slot 10 formed in the false bottom 8 so that the plate 12 may be held against the force of the coil spring 16 in a rearward located position, whereby the slide storage means 5a may be loaded with a stack of slides S in abutting relationship, which, when the hook 18 is released from the pin 19 will be pressed by the coil spring 19 to the front end of the slide storage means 5a.

The second biassing means 11b which are located in the second slide storage means 5b are constructed and arranged in the second slide storage means 5b in the same manner as the first biassing means above described.

The first and the second slide storage means 5a and 5b are open at the front end thereof so that the first of the slides S in each stack of slides is pressed by the biassing means 11a and 11b, respectively, with the front face thereof against strip shaped projections 2' and 3' on the upper and lower guide rail 2 and 3, as best shown in FIG. 5. A slide S so located in the front end or receiving portion of one of the slide storage means may be moved along a longitudinal path, defined by the strip shaped projections 2' and 3' of the upper and lower guide rail 2 and 3 and a longitudinally extending strip shaped plate 20 fixed to the upper and lower guide rails 2 and 3, rearwardly spaced from the strip shaped projections 2' and 3' thereon, from the front end or receiving portion of one slide storage means to an exposure portion 21 formed by a window in the plate 20 intermediate the pair of uprights 4 of the frame F and from there to the front end or receiving portion of the other slide storage means, and vice versa.

First moving means are provided for pushing a slide at the front end or receiving portion of the first slide storage means 5a along the aforementioned path into the exposure portion 21 and a slide at the exposure portion 21 to the front end or receiving portion of the second slide storage means 5b, and second moving means are provided for pushing a slide located at the front end portion of the second slide storage means 5b into the exposure portion 21 and a slide located at the exposure portion into the front end or receiving portion of the first slide storage means 5a. The first moving means includes a plate-shaped pusher member 22a slidably guided between the guide rails 2 and 3 as best shown in FIG. 5 from which it can be seen that the lower and upper edge portions of the pusher member 22a are respectively guided between the stripshaped projections 3' and 3" projecting upwardly from the lower guide rail 3 and between the strip-shaped projections 2' and 2" extending downwardly from the upper guide rail 2. The first pusher member 22a is moved during each actuation along the path defined by the guide rails 2 and 3 along a working stroke from the rest position shown in FIG. 1 in which the first pusher member 22a is located in the region of the front end portion of the first slide storage means 5a towards the right, as viewed in FIG. 1, that is toward and beyond the exposure portion formed by the window 21 to an advanced position and along a return stroke back to its rest position. The second moving means includes a second pusher member 22b located in its rest position forwardly of the front end portion of the second slide storage means 5b and movable from this rest position towards the left, as viewed in FIG. 1, toward and beyond the window 21 to an advanced position and along a return stroke back to its rest position. A pair of slide engaging means 23 are carried by each of the pusher members 22a and 22b, as best shown in FIGS. 1 and 4 for the pusher member 22a. Each of the slide engaging means 23 includes a fixed hinge part 23' fixed to the plate-shaped pusher member and a movable hinge part 23" hingedly connected to the fixed hinge part 23' by a hinge pin 24. A coil spring 25 is wound about a portion of the hinge pin 24 and opposite ends of the coil spring 25 respectively engage the fixed and the movable hinge part in such a manner so as to tend to hold the movable hinge part 23" in an active position in which the movable hinge part 23" extends substantially normal to the fixed hinge part 23' in rearward direction toward the strip-shaped plate 20. The plate-shaped pusher member 22a is formed in the region of the movable hinge part 23" of the left slide engaging means 23, as viewed in FIG. 1, with a cutout 26 so that the movable hinge part 23' may move through the cutout 26 to its active position as best shown in FIG. 3. The fixed hinge part 23' of the right slide engaging means, as viewed in FIG. 1, of the pusher member 22a, is fixed in the region of the right edge of the pusher member 22a, so that the movable hinge part 23" of the right pusher member 23, as viewed in FIG. 1, becomes located beyond the right front edge of the pusher member 22a and can thereby move to its active position. When the pusher member 22a is in its rest position, as shown in FIG. 1, the movable hinge part 23" of the right slide engaging means 23, as viewed in FIG. 1, is however held in its inactive position against the force of the coil spring 25 by an upwardly projecting portion 3''' on the lower guide rail 3 as can be clearly ascertained from FIGS. 1 and 3.

The second pusher member 22b is also provided with a pair of slide engaging means 23 arranged and constructed in exactly the same manner as described in connection with the slide engaging means 23 on the first pusher member 22a. In FIG. 1 the pair of slide engaging means 23 on the second pusher member 22b are however covered by cover plates 27 and 28, respectively, which are fixed in any convenient manner to the second pusher member 22b, and of course corresponding covers 27 and 28 are also provided for the first pusher member 22a. However these covers are removed from the pusher member 22a in FIG. 1 in order to clearly show the pair of slide engaging means.

The hinged parts 23" of the pair of slide engaging means on the pusher member 22a are spaced in longitudinal direction of this pusher member from each other so that the leading or right edges, as viewed in FIG. 1 of the hinged parts of the pair of slide engaging means 23 will, during movement of the pusher member 22a from its rest to its advanced position, engage at about the same time the left edges, as viewed in FIG. 1, of a pair of slides respectively located at the front end portion of the first slide storage means 5a and at the exposure portion or window 21 so as to move the slide located at the front end portion of the first slide storage means 5a into the exposure portion 21 and the slide located at the exposure portion 21 into the front end or receiving portion of the second slide storage means 5b.

The slide engaging means on the second pusher member 22b cooperate correspondingly with slides located at the front end portion of the second slide storage means and a slide located at the exposure portion 21.

First drive means 29a are provided to move the first pusher member 22a along its working stroke and its return stroke and second drive means 29b serve to move the second pusher member 22b along its working stroke and its return stroke. The first drive means 29a include a drive motor 30a (FIG. 2) which drives over a gearing 31a, only schematically shown in the drawing and preferably including a worm and worm gear, crank means including a cam disk 32a and a pin 34a projecting normal to the plane of the cam disk from a region adjacent to the periphery thereof. A connecting rod 33a is pivotally connected at one end thereof to the pin 34a and at the other end thereof pivotally connected by means of a pin 35a to a projecting portion 36a integral with the pusher member 22a and projecting upwardly therefrom through a slot 37 (FIG. 5) in the upper guide rail 2. The second drive means 29b which drive the pusher member 22b, likewise includes a motor 30b driving over a gearing 31b, crank means constituted by a cam disk 32b and a pin 34b projecting therefrom. A connecting rod 32b is pivotally connected at opposite ends thereof to the pin 34b and to a pin 35b which pivotally connects the lower end of the connecting rod 32b to the projection 36b on the pusher member 22b. The motors 30a and 30b are respectively mounted on the uprights 4 of the frame means F as best shown in FIG. 2. It should be noted that the cam disk 32a of the first drive means is located above the front end of the second slide storage means 5b, whereas the cam disk 32b is located above the front end of the first slide storage means 5a. The cam disk 32a has a peripheral cam face 32a' with a raised cam portion 32a", and the cam disk 32b has a peripheral cam face 32b' with a raised cam portion 32b".

The slide changer according to the present invention includes also first displacement means 37a for moving a stack of slides in the first storage means 5a in direction away from the front end portion thereof each time a slide from the exposure portion 21 is moved by the second pusher member 22b into the front end portion of the first slide storage means 5a, and second displacement means 37b for moving a stack of slides in the second slide storage means 5b in direction away from the front end portion thereof each time a slide from the exposure portion 21 is moved by the first pusher member 22a into the front end portion of the second slide storage means 5b.

The first displacement means 37a, best shown in FIGS. 1 and 4, are mounted on the first pusher member 22a and include a pair of rollers or engaging members 38 mounted spaced from each other on a vertical shaft 39 turnably carried on ears 41' projecting from opposite ends of a movable hinge part 41 which in turn is pivotally connected by means of a pivot pin 42 to a hinge part 40 fixed by screws or the like to the pusher member 22a. A small coil spring 43 wound about the hinge pin 42 engages with opposite ends thereof the stationary hinge part 40 and the movable hinge part 41 on the rear faces thereof tending thereby to move the movable hinge part 41 in clockwise direction about the pivot pin 42 and to move thereby the rollers 38 to an inactive position disengaged from a slide at the front end portion of the first slide storage means 5a. A plate 45 fixed to the front surface of the stationary hinge part 40 and partly overlapping the movable hinge part 41, shown only partly in FIG. 4, limits the movement of the movable hinge part in clockwise direction under the action of the spring 43. As clearly shown in FIG. 4, the first pusher member 22a is provided in the region of the movable hinge part 41 and the rollers 38 mounted thereon with a rectangular cutout or window 44 so that the rollers 38 may move through the window 44 into engagement with a slide S located at the front end portion of the first slide storage means 5a.

The second displacement means 37b, only schematically and partially illustrated in FIG. 1 are constructed and arranged on the second pusher member 22b exactly in the same manner as the first displacement means 37a are mounted on the first pusher member 22a.

Movement of the first displacement means 37a from an inactive position, in which the rollers 38 thereof are disengaged from a slide at the front end portion of the first slide storage means 5a, to an active position, in which the rollers 38 will engage the slide at the front end portion of the first slide storage means 5a and move the stack of slides in the first slide storage means in rearward direction, is derived from the cam 32b of the second moving means, and movement of the second displacement means 37b from its inactive to its active position is derived from the cam 32a of the first moving means. First motion transmitting means 45a are provided for transmitting a drive from the cam 32b to the first displacement means 37a, and second motion transmitting means 45b are provided for transmitting a drive from the cam 32a of the first moving means to the second displacement means 37b.

The first motion transmitting means 45a (FIG. 1) include a double-armed lever 47a pivotally mounted intermediate its ends by means of a pivot pin 48a on a bracket 46a fixed by screws or the like to the upper guide rail 2. The lower end of the lever 47a is formed with an elongated slot 47a' through which a pin 50a fixed to a slide member 51a slidingly extends. The elongated slide member 51a is guided for movement in longitudinal direction thereof by means of two guide brackets 54a fixed to the lower guide rail 3 as best shown in FIGS. 1 and 5. The slide member 51a has at its right free end portion 52a, as viewed in FIG. 1, an outwardly curved end, which in the retracted position as shown in FIG. 1, is slightly spaced from the peripheral surface of the lower roller 38 of the first displacement means 37a. A coil tension spring 53a connected at opposite ends thereof to the left bracket 54a, as viewed in FIG. 1, and to the pin 50a, respectively, is tensioned to resiliently maintain the slide member 51a in its retracted position. At the same time, the spring 53a maintains a cam follower or roller 49a, turnably carried on the upper end of lever 47a, in contact with the peripheral cam face 32b' of the cam 32b.

The motion transmitting means for transmitting a drive from the cam 32a of the first moving means to the second displacement means 37b are arranged and constructed in a similar manner as clearly shown in FIG. 1 and corresponding elements of the second motion transmitting means 45b are correspondingly numbered whereby a suffix b is used instead of the suffix a.

Operator controlled actuating means are provided to selectively actuate either the first or the second drive means. The operator controlled actuating means include, as shown in the wiring diagram of FIG. 7, a double pole, double throw switch 55, the two contact arms of which may be turned from a rest position of the switch 55 either in the direction of the arrow a or in the direction of the arrow b so that the left contact arm, as viewed in FIG. 7 makes contact with the stationary contact 55a, or that the right contact arm makes contact with the stationary contact 55b. The switch 55 is constructed in a known manner to automatically return to the rest position as shown in FIG. 7 when released by the operator. A pair of microswitches 56a and 56b cooperate with the operator controlled switch 55 in a manner as will be described later on in detail. The microswitch 56a has a pair of contacts 56a' and 56a" and a movable contact arm 57a, and the microswitch 56b has a pair of contacts 56b' and 56b" and a movable contact arm 57b. The contact arm 57a cooperates with a cam portion 32a''' on the cam 32a, and the contact arm 57b cooperates with a cam portion 32b''' on the cam disk 32b. The contact arms 57a and 57b are shown strictly schematically in FIG. 7 and in the actual construction the contact arms do not engage directly the respective cam portions, but each of the microswitches includes in known manner a lever having a free end riding on the cam and which is operatively connected to and electrically insulated from the respective contact arm to move the same according to the position of the lever. The microswitches 56a and 56b are constructed so that the contact arm 57a when not actuated is in contact with the contact 56a" and the contact arm 57b in contact with the contact 56b". In the position shown in the wiring diagram of FIG. 7 the contact arms 57a and 57b are, however, moved by the respective cam portions to the positions shown in which the contact arm 57a makes contact with the contact 56a' and the contact arm 57b makes contact with the contact 56b'. It is further mentioned that the cam portion 32a''' and 37b''' on the cams 32a and 37b do in the actual construction not project from the peripheral surfaces of the respective cams, but these cam portions are provided as clearly shown in FIG. 2 on the rear faces of the respective cams. In the wiring diagram of FIG. 7 the cam portions 32a''' and 32b''' are illustrated schematically projecting from the peripheral surfaces of the respective cams in order to more clearly illustrate the cooperation of these cam portions with the respective microswitches.

The reversible slide changer above described will operate as follows:

Before the start of the operation the operator may, for instance, grasp the button 14 of the first biassing means 11a located in the first slide storage means 5a and pull the first biassing means 11a rearwardly against the force of the tension spring 16, whereby the first displacement means 11a may be conveniently held in its rear position by hooking the hook 18 onto the pin 19. Then the operator places a stack of slides S he wants to project into the first slide storage means 5a and releases the hook 18 so that the plate 12 pulled forward by the spring 16, will contact and push the stack of slides forwardly whereby the first slide will be pushed in the front end portion of the slide storage means 5a and abut with upper and lower portions of its front surface respectively against the strip-shaped projections 2' and 3' respectively provided on the upper and lower guide rails 2 and 3 as shown in FIG. 5. In order to move this first slide thus located in the front end portion of the first slide storage means 5a into the exposure portion, that is the window 21, the operator will momentarily operate the switch 55 in the direction of the arrow *a* so that the left contact arm of the switch 55, as viewed in FIG. 7, will make contact with the stationary contact 55*a* of the switch 55 whereby current will flow from one pole of the current supply through the contact arm 57*a* of the microswitch 56*a*, the contact 56*a'* of this microswitch, through the contact arm 57*b* of the microswitch 56*b*, the contact 56*b'* of the latter and from there through the closed contact 55*a* to the motor 30*a* and back to the other pole of the current supply. The motor 30*a* starts thereby turning and will turn the cam disk 32*a* in the direction of the arrow shown in FIG. 7. During turning of the cam disk 32*a* in counter-clockwise direction the contact arm 57*a* respectively the lever operating this contact arm will slip off from the cam portion 32*a'''* so that the microswitch 56*a* will establish contact between the contact arm 57*a* and the contact 56*a''* whereby the motor 30*a* remains supplied with current even if the operator releases the switch 55 and the latter returns to its rest position as shown in FIG. 7.

As the cam disk 32*a* turns in the counter-clockwise direction it will move through the connecting rod 33*a* the first pusher member 22*a* towards the right, as viewed in FIG. 1, and the left slide engaging means 23, as viewed in FIG. 1 on the pusher member 22*a* will engage the left edge of the slide S located in the front end portion of the first slide storage means 5*a*, whereby the movable hinge part 23'' of this slide engaging means is held in its active position by the spring 25 cooperating therewith, and during movement of the first pusher member 22*a* towards the right, the engaged slide S will be moved along the guide rails 2 and 3 into the exposure portion 21 of the slide exchanger. During further turning of the cam disk 32*a*, the first pusher member 22*a* will perform its return stroke and return to its rest position as shown in FIG. 1. Shortly before the cam disk 32*a* finishes a full revolution, the cam portion 32*a'''* will move the contact arm 57*a* of the microswitch 56*a* back to the position as shown in FIG. 7, thereby shutting off the motor 30*a* and during the last part of its revolution the cam disk 32*a* is not driven by the motor 30*a* but moves simply under its own inertia to return the first pusher member 22*a* to its rest position.

During the first actuation of the first pusher member 22*a* the slide engaging means 23 mounted on the right front edge thereof, as viewed in FIG. 1, will not perform any action since during the first actuation of the pusher member 22*a* no slide is in the exposure portion 21. During the first return stroke of the pusher member 22*a* the slide engaging means at the front edge thereof will turn against the action of its spring 25 to its inactive position when the free edge of the movable hinge 23'' engages the right edge, as viewed in FIG. 1, of a slide placed into the exposure portion 21 during the first working stroke of the pusher member 22*a*. This slide at the exposure portion is preferably held by a spring 58, shown in FIG. 2, which engages the top edge of the slide at the exposure portion with a force greater than the force exerted by the spring 25 so that the movable hinge part 23'' of the slide engaging means on the edge of the first pusher member 22*a* may turn to its inactive position without displacing the slide at the exposure portion 21. As the first slide in the slide storage means 5*a* is moved in the aforementioned manner from the front end portion of the first slide storage means into the exposure portion 21, the resilient means 11*a* in the first slide storage means will press the stack of slides forwardly so that the next slide of the stack will become located at the front end portion of the first slide storage means 5*a*. During the return stroke of the first pusher member 22*a* the movable hinge part 23'' of the slide engaging means carried on the left side, as viewed in FIG. 1, of the first pusher member 22*a* will also move to its inactive position as the movable hinge part thereof engages the right edge, as viewed in FIG. 1, of the slide located at the front end portion of the first slide storage means 5*a*, and, after the movable hinge part has passed the left edge of this slide, it will return to its active position under the influence of the spring 25.

When the operator now actuates again momentarily the switch 55 in the direction of the arrow *a*, the motor 30*a* is again energized and the first pusher member 22*a* will again move from its rest position shown in FIG. 1 along its working stroke to its advanced position towards the right, as viewed in FIG. 1. The movable hinge part 23'' of the left slide engaging means mounted on the first pusher member 22*a* will thereby engage the left side edge of a slide S located now at the front end portion of the first slide storage means 5*a* to move the engaged slide into the exposure portion 21. During this movement of the first pusher member 22*a* to its advanced position the front edge of the hinge part 23'' of the leading slide engaging means 23 leaving the projection 3''' on the lower guide rail 3 will turn to its active position and engage the left side edge, as viewed in FIG. 1, of the slide placed at the exposure portion 21 during the first working stroke of the pusher member 22*a*. This slide will thereby be moved into the front end or receiving portion of the second slide storage means 5*b*.

Each time the first pusher member 22*a* is actuated in the aforementioned manner, the second motion transmitting means 45*b* will transmit a motion from the cam 32*a* driven by the motor 30*a* to the second displacement means 37*b* so as to displace slides located in the second slide storage means 5*b* rearwardly against the force of the respective spring 16. The arrangement is made in such a manner that when the right side edge, as viewed in FIG. 6 of a slide is moved by the first pusher member 22*a* from the exposure portion 21 toward the receiving portion or front end of the second slide storage means 5*b*, the raised cam portion 32*a''* on the cam 32 will come into contact with the roller 49*b* carried on the upper end of the lever 47*b* to turn this lever in clockwise direction about its pivot pin 48*b* and to move thereby the slide member 51*b* to the position as shown in FIG. 6 in which the slide member 51*b* engages the lower one of the rollers 38 of the displacement means 37*b* to move the rollers to the rearwardly displaced position as shown in FIG. 6 in which the periphery of the rollers engages a slide located in the front end portion of the second slide storage means 5*b* to rearwardly displace a stack of slides therein, so that the slide pushed by the first pusher member 22*a* from the exposure portion 21 into the receiving portion of the second slide storage means 5*b* may pass into this receiving portion without interference with the slides in the second slide storage means 5*b*. While the slide pushed by the first pusher member 22*a* is moved home into the receiving portion of the second slide storage means 5*b* the roller 49*b* has left the raised cam portion 32*a''* and the spring 53*b* has returned the slide member 51*b* again to its retracted position and the rollers 38 of the second displacement means 37*b* will return to their inactive position so that the rollers will also not interfere with the movement of the slide pushed by the pusher member 22*a* into the receiving portion of the second slide storage means 5*b*.

Obviously, by momentarily moving the switch 55 in the direction of the arrow *b*, the second pusher member 22*b* will be operated in the same manner as described above in connection with the pusher member 22*a* and therefore the operator may transfer a slide located at the front end portion of the slide storage means 5*b* to the exposure portion 21 and a slide at the exposure portion to the receiving portion of the first slide storage means 5*a*. The above described microswitches 56*a* and 56*b* will cooperate with the switch 55 to assure that the motor 30*b* can be operated only after the cam 32*a* driven by the motor 30*a* has performed a full revolution and after the pusher member 22*a* actuated by the rotating cam 32*a* has returned to its rest position, and the same holds true with regard to the operation of the motor 30*b*. Jamming of the slide changer by faulty operation of the motors is therefore positively prevented.

It will be understood that each of the elements described above, or two or more together, may also find a useful application in other types of reversible slide changers differing from the type described above.

While the invention has been illustrated and described as embodied in a reversible slide changer, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be secured by Letters Patent is:

1. A reversible slide changer including first moving means for moving slides along a predetermined path having an exposure portion and a receiving portion first into said exposure portion and then from said exposure portion into said receiving portion; slide storage means associated with said receiving portion of said predetermined path and adapted to store slides moved from said exposure portion into said receiving portion in a stack extending normal to said path to one side thereof; biasing means permanently tending to move said stack in a direction toward said receiving portion of said predetermined path; displacement means for moving said stack in a direction away from said receiving portion each time another slide is moved by the first moving means from said exposure portion into said receiving portion; second moving means for moving a slide at said receiving portion into said exposure portion; and operator controlled actuating means for selectively actuating said first and second moving means.

2. A slide changer as set forth in claim 1, and including motion transmitting means between said first moving means and said displacement means for operating said displacement means each time a slide is moved by said first moving means from said exposure portion to said receiving portion.

3. A slide changer as set forth in claim 2, wherein said receiving portion is located laterally to one side of said exposure portion and at the front end of said slide storage means, and including an additional slide storage means having a front end arranged along said path at the other side of said exposure portion and adapted to store slides in a stack extending normal to said path, and additional biasing means permanently tending to move the stack of slides in said additional storage means toward the front end of the latter, said first moving means constructed and arranged to move during each actuation thereof a slide at the front end portion of said additional storage means along said path into said exposure portion and a slide at said exposure portion to said receiving portion.

4. A reversible slide changer comprising, in combination, first slide storage means having a front end portion and adapted to store a plurality of slides in a stack rearwardly of said front end portion; first biasing means permanently tending to move a stack of slides in said first storage means in a direction toward said front end portion thereof; second slide storage means located laterally of and substantially parallel to said first slide storage means, said second slide storage means having a front end portion and adapted to store a plurality of slides in a stack rearwardly of the front end portion of said second slide storage means; second biasing means permanently tending to move a stack of slides in said second slide storage means in a direction toward said front end portion thereof; first moving means for moving a slide at said front end portion of said first slide storage means along a predetermined path to an exposure portion located along said path between said front end portions of said first and second slide storage means and a slide at said exposure portion to the front end portion of said second slide storage means; second moving means for moving a slide at the front end portion of said second slide storage means along said path to said exposure portion and a slide at said exposure portion to the front end portion of said first slide storage means; first displacement means for moving the stack of slides in said first slide storage means in directions away from the front end portion thereof each time a slide from said exposure portion is moved by said second moving means into the front end portion of said first slide storage means; second displacement means for moving the stack of slides in said second slide storage means in a direction away from said front end portion thereof each time a slide from said exposure portion is moved by said first moving means into the front end portion of said second slide storage means; and operator controlled actuating means for selectively actuating said first and said second moving means.

5. A reversible slide changer as set forth in claim 4, wherein said first moving means includes a first pusher member slidably guided along said path and moving during each actuation of said first moving means along a working stroke from a rest position in the region of the front end portion of the first slide storage means toward and beyond said exposure portion to an advanced position and along a return stroke back to said rest position, and wherein said second moving means includes a pusher member slidably guided along said path and moving during each actuation of said second moving means along a working stroke from a rest position in the region of the front end portion of said second slide storage means toward and beyond said exposure portion to an advanced position and along a return stroke back to its rest position, and a pair of slide engaging means mounted on each pusher member and each movable between an active position adapted to engage an edge of the slide and an inactive position, the pair of slide engaging means on each pusher member being spaced from each other in direction of said path such a distance that during movement of said first pusher member from the rest to the advanced position thereof one of the slide engaging means on said first pusher member engages the edge of a slide located at the front end portion of said first slide storage means to move said slide into said exposure portion and the second slide engaging means on said first pusher member engages the edge of a slide at said exposure portion to move the slide at said exposure portion to said front end portion of said second slide storage means and so that during movement of said second pusher member from the rest to the advanced portion thereof one of said slide engaging means on said second pusher member engages the edge of a slide located at the front end portion of said second slide storage means to move said slide into said exposure portion and the second slide engaging means on said second pusher member engages the edge of a slide at said exposure portion to move said last mentioned slide to the front end portion of said first slide storage means.

6. A reversible slide changer as set forth in claim 5, and including resilient means cooperating with said slide engaging means to resiliently maintain the latter in said active position.

7. A reversible slide changer as set forth in claim 6, wherein said first displacement means is mounted on said first pusher member and said second displacement means on said second pusher member.

8. A reversible slide changer as set forth in claim 7, wherein each of said displacement means is mounted on the respective pusher member between the pair of slide engaging means thereon.

9. A reversible slide changer as set forth in claim 7, wherein said first moving means includes first drive means for moving said first pusher member along said path between said positions thereof and wherein said second moving means includes second drive means for moving said second pusher member along said path between said positions thereof; and including first motion transmitting means between said second drive means and said first motion transmitting means for actuating the latter shortly before said second pusher member reaches its advanced position, and second motion transmitting means between said first drive means and said second displacement means for actuating the latter shortly before said first pusher member reaches its advanced position.

10. A reversible slide changer as set forth in claim 9, wherein said first drive means includes first crank means located in the region of the front end of said second slide storage means and a first connecting rod connecting said first crank means to said first pusher member, wherein said second drive means includes second crank means located in the region of said first slide storage means and a second connecting rod connecting said second crank means to said second pusher member, and wherein said first motion transmitting means includes first lever means mounted on the region of said first front end portion of said first slide storage means and cooperating with said second crank means for actuating said first displacement means and wherein said second motion transmitting means includes second lever means mounted in the region of the front end portion of said second slide storage means and cooperating with said first crank means for actuating said second displacement means.

11. A reversible slide changer as set forth in claim 9, wherein each displacement means includes at least one engaging member mounted on the respective pusher member movable between an active position engaging a slide at the front end portion of the respective storage means and pushing the slide rearwardly, and an inactive position, and resilient means cooperating with said engaging member and biased to resiliently maintain the latter in said inactive position, said first and said second motion transmitting means cooperating with the respective engaging member for moving the same from said inactive to said active position.

12. A reversible slide changer as set forth in claim 11, wherein said first moving means includes a first cam located in the region of the front end portion of said second slide storage means and having a first cam face, and said first connecting rod being pivotally connected at opposite ends to said first cam and said first pusher member, respectively; wherein said second moving means includes a second cam located in the region of the front end portion of said first slide storage means and having a second cam face, and said second connecting rod being pivotally connected at opposite ends to said second cam and said second pusher member, respectively; wherein said first motion transmitting means includes a first lever pivotally mounted between its ends, a cam follower mounted on one end of said first lever and riding on said second cam face, and first elongated member slidably guided along said path, connected to the other end of said first lever and adapted to engage the engaging member on the first pusher member to move said engaging member to said active position thereof when a slide is moved by said second pusher member from said exposure portion toward the front end portion of said first slide storage means, and wherein said second motion transmitting means includes a second lever pivotally mounted between its ends, a cam follower mounted on one end of said second lever and riding on said first cam face, a second elongated member slidably guided along said path, connected to the other end of said second lever and adapted to engage the engaging member on said second pusher member to move the engaging member on the sceond pusher member to the active position thereof when a slide is moved by said first pusher member from said exposure portion toward the front end portion of said second slide storage means.

13. A reversible slide changer as set forth in claim 12, wherein said first moving means includes a first motor connected to said first cam for driving the same, wherein said second moving means includes a second motor connected to the second cam for driving the latter, and wherein said actuating means includes switch means for selectively starting and stopping said first and said second motor.

14. A reversible slide changer as set forth in claim 13, wherein each of said cams includes an additional cam face, and wherein said switch means includes an operator controlled switch and a pair of additional switches connected to said operator controlled switch and cooperating with said additional cam faces in such a manner so that the operator, after having started one of the motors, can start the other motor only after said one motor has moved the pusher member connected thereto from its rest to its advanced position and back to its rest position, and so that respective motor is automatically stopped when the respective pusher member has returned to its rest position.

15. A reversible slide changer as set forth in claim 6 and including guide means extending between said front end portions of said first and second slide storage means for guiding said first and said second pusher member along said path, said guide means including portions respectively engaging the second slide engaging means on each pusher member for moving the second slide engaging means to said inactive position thereof shortly before the respective pusher member moves during its return stroke to the rest position thereof.

16. A reversible slide changer as set forth in claim 4, wherein each of said biasing means includes a plate member slidably guided in the respective slide storage means and adapted to engage the last slide of a stack of slides in the respective slide storage means, and spring means connected to said plate member and biased to move the latter toward the front end portion of the respective slide storage means.

References Cited
UNITED STATES PATENTS 2,632,362   3/1953   Smith _____ 40—79 X
2,705,437   4/1955   Lessman _____ 40—79 X EUGENE R. CAPOZIO, *Primary Examiner.*

R. CARTER, *Assistant Examiner.*